United States Patent [19]
Inoue et al.

[11] Patent Number: 5,303,357
[45] Date of Patent: Apr. 12, 1994

[54] LOOP OPTIMIZATION SYSTEM

[75] Inventors: Atsushi Inoue; Kenji Sirakawa, both of Yokohama, Japan

[73] Assignee: Kabushiki Kaisha Toshiba, Kawasaki, Japan

[21] Appl. No.: 863,709

[22] Filed: Apr. 3, 1992

[30] Foreign Application Priority Data

Apr. 5, 1991 [JP] Japan .................................. 3-071979

[51] Int. Cl.⁵ .......................... G06F 9/45; G06F 9/06
[52] U.S. Cl. ................................... 395/375; 364/938; 364/262
[58] Field of Search ...................... 395/775, 800, 375

[56] References Cited

U.S. PATENT DOCUMENTS

| | | | |
|---|---|---|---|
| 4,642,765 | 2/1987 | Cocke | 395/700 |
| 4,782,444 | 11/1988 | Munshi | 395/700 |
| 4,802,091 | 1/1989 | Cocker | 395/700 |
| 4,858,115 | 8/1989 | Rusterholz | 395/800 |
| 5,109,331 | 4/1992 | Ishida et al. | 395/375 |
| 5,226,128 | 7/1993 | Rau | 395/375 |
| 5,230,053 | 9/1993 | Zaiki | 395/700 |

OTHER PUBLICATIONS

Proc. of 2nd ASPLOS, pp. 105–109, 1987, S. Weiss, et al., "A Study of Scalar Compilation Techniques for Pipelined Supecomputers".
Proc. of ACM Sigplan 1988 Conf. on Prog. Lang. Design and Implementation, pp. 318–328, 1988, M. Lam, "Software Pipelining: An Effective Scheduling Technique for VLIW Machines".

Primary Examiner—David Y. Eng
Attorney, Agent, or Firm—Oblon, Spivak, McClelland, Maier & Neustadt

[57] ABSTRACT

In loop processing by an electronic computer that simultaneously executes a plurality of instructions, a loop optimization system according to this invention comprises loop analyzing means for judging whether or not the process of expanding iterations of instructions in a loop into one iteration is performed based on at least one of the number of operations in each iteration in the loop and the number of memory access instruction; loop expanding means for converting a given number of iterations in an instruction sequence of the loop into an equivalent instruction sequence where those iterations are expanded into one iteration; and loop optimizing means for rearranging instructions in the developed loop so that different repetitious operations may be allocated to separate processing units for simultaneous execution.

7 Claims, 5 Drawing Sheets

```
double A[100], b, c;
main ( )
{
  int i;
  for (i=0; i<100; i++)
    A[i] = A[i]*b+c;
}
```

SOURCE PROGRAM

FIG. 1A

```
        ld    $f0   @b
        ld    $f2   @c
        ldi   $2    @A[0]+800
        ldi   $3    @A[0]
LOOP:
        ld    $f4   0($3)
        mul   $f6,$f4,$f0
        add   $f8,$f8,$f2
        st    $f8,0($3)
        addi  $3,$3,8
        bne   $3,$2,LOOP
```

ASSEMBLER PROGRAM

FIG. 1B

| CLOCK NUMBER | REPETITION k | k+1 | k+2 | k+3 | |
|---|---|---|---|---|---|
| 1. | ld | | | | |
| 2. | mul | | | | |
| 3. | — | ld | | | |
| 4. | — | mul | | | |
| 5. | add | — | ld | | |
| 6. | — | — | mul | | |
| 7. | — | add | — | ld | ⎤ A LOOP IS |
| 8. | st | — | — | mul | ⎬ FORMED |
| 9. | — | — | add | — | ⎦ HERE |
| 10. | | st | — | — | |
| 11. | | | — | add | |
| 12. | | | st | — | |
| 13. | | | | — | |
| 14. | | | | st | |

EXECUTING STATE WITH SOFTWARE PIPELINING

FIG. 1C

```
double A[100],B[100];
main ( )
{
  int i;
  for (i=0;i<100;i++)
    A[i]=A[i]+B[i];
}
```

SOURCE PROGRAM

FIG. 2A

```
        ldi  $2 @A[0]+800
        ldi  $3 @A[0]
        ldi  $4 @B[0]
LOOP:
        ld   $f4,0 ($3)
        ld   $f6,0 ($4)
        add  $f8,$f4,$f6
        st   $f8,0 ($3)
        addi $3,$3,8
        addi $4,$4,8
        bne  $4,$2,LOOP
```

ASSEMBLER PROGRAM

FIG. 2B

| CLOCK NUMBER | REPETITION k | k+1 | k+2 |
|---|---|---|---|
| 1. | ld | | |
| 2. | ld | | |
| 3. | add | ld | |
| 4. | — | ld | |
| 5. | — | add | ld |
| 6. | st | — | ld |
| 7. | | — | add |
| 8. | | st | — |
| 9. | | | — |
| 10. | | | st |

A LOOP IS FORMED HERE

EXECUTING STATE WITH SOFTWARE PIPELINING

FIG. 2C

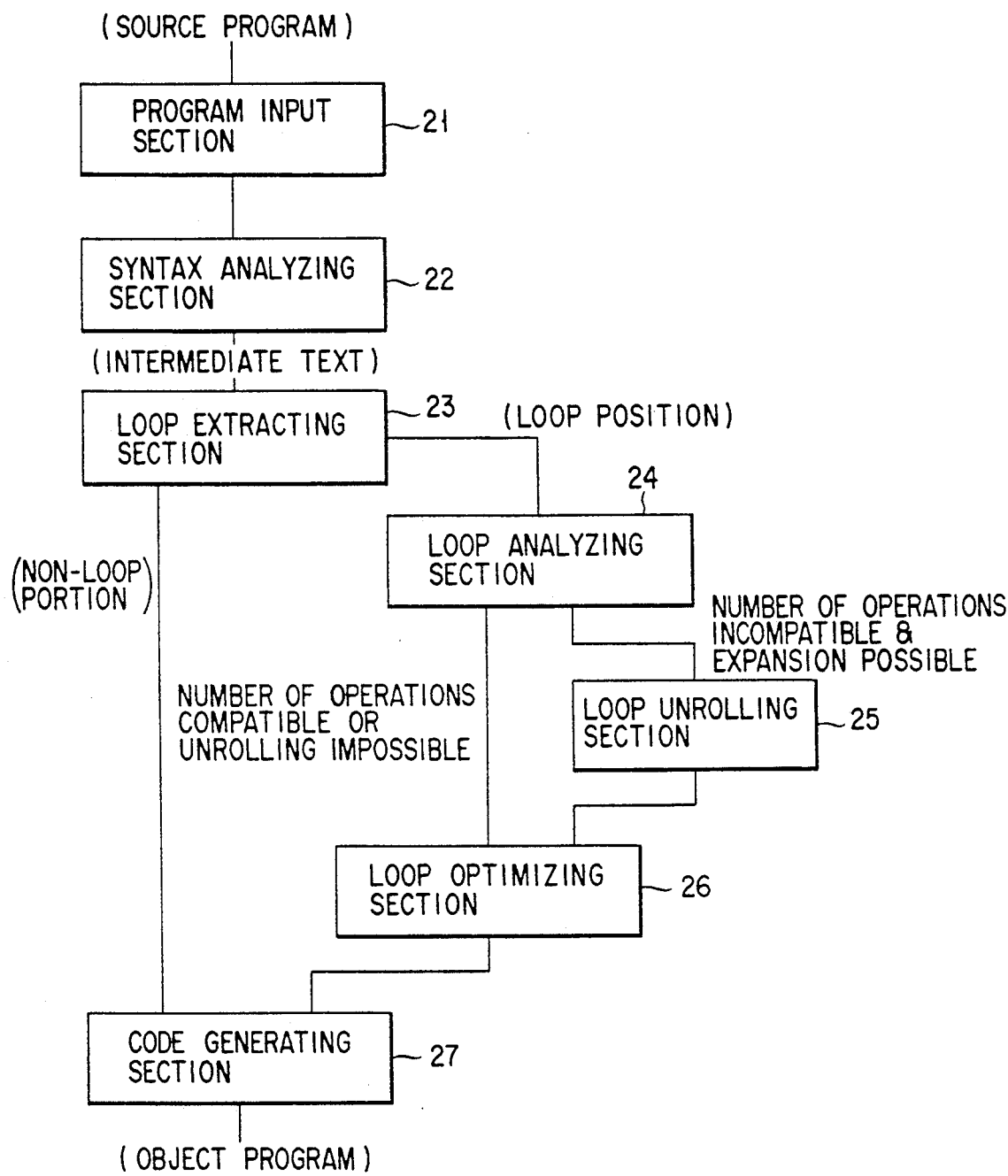
F I G. 3

```
double x[100], y[100];
main ( )
{
   int i;
   for (i=1;i 100; i++)
     y[i]= y[i-1] - x[i];
}
```

FIG. 4

```
double A[100], B[100];
main ( )
{
    int i;
    for (i=1; i<100; +=2)
        A[i] = A[i]+B[i];
        A[i+1]= A[i+1]+B[i+1];
}
```

SOURCE PROGRAM

FIG. 5A

```
        ldi  $2,@A[0]+800
        ldi  $3,@A[0]
        ldi  $4,@B[0]
LOOP:
        ld   $f4, 0 ($3)
        ld   $f6, 0 ($4)
        ld   $f12,0 ($3)
        ld   $f10,0 ($4)
        add  $f8, $f4, $f6
        add  $f14,$f12,$f10
        st   $f8, 0 ($3)
        st   $f14,8 ($3)
        addi $3, $3, 16
        addi $4, $4, 16
        bne  $4, $2, LOOP
```

ASSEMBLER PROGRAM

FIG. 5B

| CLOCK NUMBER | REPETITION k | k+1 | k+2 | |
|---|---|---|---|---|
| 1. | ld | | | |
| 2. | ld | | | |
| 3. | add | ld | | |
| 4. | ld | ld | | |
| 5. | ld | add | ld | |
| 6. | add | ld | ld | A LOOP IS FORMED HERE |
| 7. | st | ld | add | |
| 8. | st | add | ld | |
| 9. | | st | ld | |
| 10. | | st | add | |
| 11. | | | st | |
| | | | st | |

EXECUTING STATE WITH SOFTWARE PIPELINING

FIG. 5C

LOOP OPTIMIZATION SYSTEM

BACKGROUND OF THE INVENTION

1. Field of the Invention

This invention relates to a loop optimization system in an electronic computer capable of executing plural sequences of instructions in parallel.

2. Description of the Related Art

Conventionally, plural sequences of instructions are designed for serial processing by the electronic computer, which executes instructions, one at a time, according to the instruction sequence.

Pipelining techniques have been introduced for the high-speed processing of an instruction sequence. In this technique, the execution of instructions is divided into a plurality of stages, and the instructions belonging to the different stages thus obtained are carried out simultaneously. This approach can shorten the cycle time, thereby shortening the processing time of the entire instruction sequence. Such a pipeline system, however, still executes only one instruction per cycle, far from two or more instructions per cycle of parallel execution.

In recent years, systems performing parallel execution on an instruction level have been introduced, which enables execution of more than one instruction per cycle. The VLIW (Very Long Instruction Word) system and the superscalar system are two typical ones of this type.

In the VLIW system, a predetermined number of instructions are defined as a single execution unit, and the computer always executes the set of instructions at the same time. Here, the computer does not have to judge whether a plurality of instructions to be executed are able to be carried out simultaneously, which simplifies control, thus making it possible to construct the system using a small amount of hardware and attain shorter cycle times. However, it is necessary for a compiler or an expert to judge whether the processing is suitable for parallel execution and base on the result, allocate appropriate instructions in advance.

The superscalar system has hardware that interprets a plurality of instructions designed for serial processing to determine whether they can be executed in parallel, and that when finding parallel execution possible, carries out more than one instruction in parallel. In this system, the judgment of whether instructions are suitable for parallel execution is left to special hardware, which assures that even an ordinary program is executed, keeping compatibility with serial executions. To improve the performance of the superscalar system, it is essential to perform the scheduling of instructions as with the VLIW system in order to place the operation units in an operating state as long as possible, depending on information such as hardware resources or data dependence.

For the parallel execution system, especially for an instruction rearranging system to speed up the execution of loop portions in a program, a software pipelining system is available which allocates one iteration of loop to a unique hardware resource and simultaneously executes virtual iterations of loops using separate processing units in a pipeline manner.

For example, it is assumed that software pipelining is executed by a VLIW computer composed of a floating point unit, a memory (load, store) unit, an integer unit, and a branch unit. It is also assumed that a floating point add instruction and a multiply instruction have a delay of 2 cycles.

A loop written in the C language in FIG. 1A will be explained.

If scalar variables b and c have been loaded into the register, the following four processing stages will complete one iteration of loop:

(1) Loading into A[i]
(2) Multiplying A[i]*b
(3) Adding A[i]*b+c
(4) Storing the result Therefore, a set of instructions in a conventional serial computer may be obtained as shown in FIG. 1B. Since the software pipelining deals with each stage using a separate unit, the executing state at each clock is such as shown in FIG. 1C. With the steady state of loop execution at clocks 7 and 8, load and mul at the k+3 time iteration, add at the k+1 time iteration, and store at the k time iteration are processed in a multiplex manner. This software pipelining allows efficient loop processing without idling the units (for addition, multiplication, loading, and storing) the hardware has. The VLIW and superscalar systems require the above rearrangement to be carried out by the compiler without handling (modifying) the source program.

In the loops in FIGS. 1A through 1C, use of software pipelining enables efficient rearrangement, but does not always provide the maximum parallel processing capabilities the processor has. The reason will be explained below.

The portions indicated by '·' in FIG. 1C are delay cycles in calculation. Generally, in the VLIW and superscalar systems, each processing unit often undergoes pipeline control. If an independent operation instruction is available for such a delay cycle, it is possible to supply that instruction to each processing unit to insert it in a delay cycle for higher parallel performance. In this example, however, there is no appropriate operation for this purpose. Thus, even if the original loop has empty instruction slots, because of very simple processing, those slots cannot be filled with suitable instructions, sometimes failing to achieve the maximum parallel performance.

For example, the loop in FIG. 2A is a simple loop with only one addition. Instructions corresponding to the loop of FIG. 2A is shown in FIG. 2B. Three-stage software pipelining of the instruction only provides the executing state in FIG. 2C. In this case, although another independent additional operation can be inserted into two clocks of the delay cycle in the add operation, those 2 clocks are wasted because there is no appropriate instructions available for them. Therefore, for such a loop, direct use of software pipelining in the VLIW or superscalar system cannot provide the maximum parallel processing capabilities by making full use of the operation units the system has.

As noted above, when the number of operation instructions in one loop iteration, the number of memory access instructions, and the number of operation units the processor has harmonize with each other, loop optimization by software pipelining provides efficient parallel execution. When the loop has a small number of operations, however, some of the operation units in the processor lie idle, resulting in less effective parallel operation.

As described above, conventional software pipelining for the VLIW or superscalar system has a problem:

when a loop in a program has a small number of operations compared with the number of operation units the processor has, it is impossible to perform parallel execution using all the operation units in the processor, making it unable to achieve satisfactory parallel processing performance.

The related literature of this invention includes S. Weiss and J. E. Smith, "A STUDY OF SCALAR COMPLICATION TECHNIQUES FOR PIPELINED SUPERCOMPUTERS," Proc of 2nd ASPLOS, 1987, pp. 105-109, and M. Lam, "Software Pipelining: An Effective Scheduling Technique for VLIW Machines," Proceeding of the SIGPLAN' 88 Conference on Programming Language and Implementation, Jun., 22-24, 1988, pp. 318-328.

SUMMARY OF THE INVENTION

The object of this invention is to provide a loop optimization system capable of achieving sufficient parallel performance independent of the number of operations in each loop of a program.

The foregoing object is accomplished by providing a loop optimization system comprising: a loop analyzing section for judging whether or not loop unrolling is feasible based on the number of operations in the object loop and data cross-reference; a loop expanding section for performing loop unrolling based on the results from the loop analyzing section; and a loop optimizing section for applying software pipelining to the developed loop, wherein the individual loops undergo pre-editing depending on the number of operations in each loop and its access pattern, followed by the optimization of its loop portions.

With the present invention, based on the number of operations, the number of data references, and the data cross-reference, each loop is checked for a case where direct application of conventional software pipelining cannot provide sufficient parallel performance because the number of operations in the loop does not harmonize with the number of units in the processor. Having a pre-editing run on such an inefficient loop to expand iterations in the loop in advance increases the number of operations in one iteration in the loop, which harmonizes the number of operation units with the number of operations. After this, software pipelining is performed. As a result, even with a loop where a conventional system could not achieve sufficient parallel performance, this invention assures high parallel performance. In addition, the present invention provides a loop optimization system capable of improving loop processing efficiency in the VLIW and superscalar systems.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1A shows a source program used to explain conventional techniques;

FIG. 1B shows an assembler program obtained by translating the program of FIG. 1A into plural sequences of instructions suitable for a conventional serial computer;

FIG. 1C illustrates the executing state when software pipelining is applied to the program of FIG. 1A;

FIG. 2A shows a source program used to explain conventional techniques;

FIG. 2B shows an assembler program obtained by translating the program of FIG. 2A into plural sequences of instructions suitable for a conventional serial computer;

FIG. 2C illustrates the executing state when software pipelining is applied to the program of FIG. 2A;

FIG. 3 is a block diagram showing the structure of a compiler to which a loop optimization system according to an embodiment of the present invention is applied;

FIG. 4 shows a source program which is judged by the loop analyzing section of the present invention to be that inappropriate for loop unrolling;

FIG. 5A shows a source program obtained by having a pre-editing run on the program of FIG. 2A to expand loop iterations with the loop optimization system of the present invention;

FIG. 5B shows an assembler program obtained by translating the program of FIG. 5A into plural sequences of instructions suitable for a conventional serial computer; and FIG. 5C illustrates the executing state when software pipelining is applied to the program of FIG. 5A.

DETAILED DESCRIPTION OF THE PREFERRED EMBODIMENT

Referring to the accompanying drawings, an embodiment of the present invention will be explained.

FIG. 3 shows the structure of a compiler to which a loop optimization system according to an embodiment of the present invention is applied. This compiler is composed of a program input section 21, a syntax analyzing section 22, a loop extracting section 23, a loop analyzing section 24, a loop expanding section 25, a loop optimizing section 26, and a code generating section 27.

A source program read by the program input section 21 is converted into an intermediate text at the syntax analyzing section 22, and then is supplied to the loop extracting section 23. This extracting section 23 checks the intermediate text for loop portions, extracts them from the program, and supplies them to the loop analyzing section 24.

The loop analyzing section 24 checks for the number of arithmetic instructions and the number of memory access instructions, and judges whether the direct application of software pipelining to the loop provides sufficient performance. The criteria for this judgment may be as follows, for example:

(1) When the number of arithmetic instructions in a loop is smaller than a certain value, loop unrolling is carried out.

(2) When the ratio of the number of arithmetic instructions in a loop to the number of memory access instructions is lower than a certain value, loop unrolling is performed.

(3) When the ratio of the number of operation instructions in a loop to the number of operation units the processor has is lower than a certain value, loop unrolling is executed.

These criteria may be set freely depending on the arithmetic instruction performance of the processor (how many clocks each operation delays), the unit construction, or the like.

Figure 4:
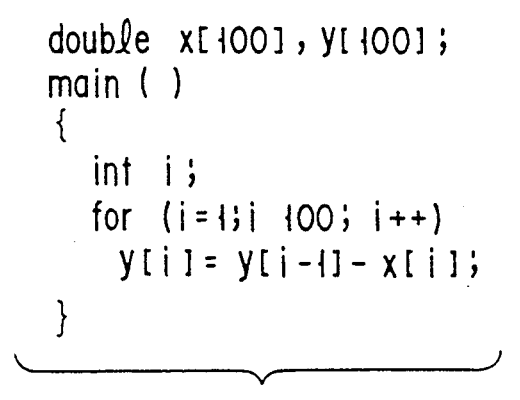

While performing loop unrolling, the loop analyzing section 24 also determines whether there is any data cross-reference between iterations that requires serial executions. This analysis can be achieved by data dependence analyzing techniques where the subscript expressions for the array appearing on both sides of the expression-statement in a loop are checked for to see if those on each side take the same value. For example, since the loop in FIG. 4 uses the result of the k time iteration in the k+1 time iteration, loop iteration is basically of serial execution. When there is a data cross-reference in a loop as shown in FIG. 4, the loop optimization section 26 subjects the loop to direct software pipelining instead of loop unrolling because the unrolling does not increase the number of independent operation instructions.

On the basis of such criteria, once the loop analyzing section 24 has judged that the loop should be expanded, the loop expanding section 25 performs loop unrolling.

For example, the loop of FIG. 2A is assumed to meet the loop expanding requirements. The loop expanding section 25 expands or converts the loop into the loop format equal to that shown in FIG. 5A. In this case, the number of loop expanding stages is 2, but it may be set to any other value depending on the construction of the processor, compiling time, and restrictions on the object code size. FIG. 5B shows a sequence of instructions corresponding to the loop converted at the loop expanding section 25 as shown in FIG. 5A. This set of instructions can be executed through software pipelining at the loop optimizing section 26, as shown in FIG. 5C. In comparison with FIG. 2C, FIG. 5C has an ld/st instruction for another operation inserted after the add instruction, so that there are no empty slots in the operation delay cycle seen in FIG. 2C. Therefore, this processing approach provides parallel processing. making full use of the processing units the processor has.

The intermediate text thus subjected to loop optimization is translated by the code generating section 27 into machine language, which is then supplied as an object program.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. In an electronic computer that simultaneously executes a plurality of instructions in a program with a loop process containing an instruction sequence for performing operation or memory access, a loop optimization system for said loop process, comprising:

loop analyzing means for judging whether or not the process of expanding iterations of instructions in a loop into one iteration is performed based on at least one of the number of operations in each iteration in the loop and the number of the memory access instruction;

loop expanding means for converting a given number of iterations in an instruction sequence of the loop into an equivalent instruction sequence where those iterations are expanded into one iteration; and loop optimizing means for rearranging instructions in the developed loop so that different repetitious operations may be allocated to separate processing units for simultaneous execution.

2. A loop optimization system according to claim 1, wherein said loop expanding means contains means for executing loop unrolling when the number of operations in the loop sensed at said loop analyzing means is lower than a reference value.

3. A loop optimization system according to claim 1, wherein said loop expanding means contains means for executing loop unrolling when the ratio of the number of operations in the loop sensed at said loop analyzing means to the number of load and store instructions in the loop exceeds a reference value.

4. A loop optimization system according to claim 1, wherein said loop expanding means contains means for executing loop unrolling when the ratio of the number of operations in the loop sensed at said loop analyzing means to the number of operation units the computer has exceeds a reference value.

5. A loop optimization system according to claim 1, wherein said loop analyzing means includes means for determining the number of the loop unrolling stage based on whether or not data cross-reference is required in serial processing between iteration during unrolling the loop and said loop expanding means includes means for unrolling the loop with the number of the stage no more than the number of the stage determined said loop analyzing means.

6. A loop optimization system according to claim 5, wherein said loop analyzing means contains means for analyzing data in the loop by data dependence analyzing techniques.

7. A loop optimization system according to claim 1, further comprising syntax analyzing means for converting a source program into an intermediate text, and loop extracting means for sensing and extracting loop portions from said intermediate text.

* * * * *